(12) United States Patent
Byun

(10) Patent No.: US 12,311,226 B2
(45) Date of Patent: May 27, 2025

(54) EXERCISE EQUIPMENT FOR BACK

(71) Applicant: Newtech wellness Corporation, Gimhae-si (KR)

(72) Inventor: Hyun Jung Byun, Busan (KR)

(73) Assignee: Newtech wellness Corporation, Gimhae-si (KR)

( * ) Notice: Subject to any disclaimer, the term of this patent is extended or adjusted under 35 U.S.C. 154(b) by 226 days.

(21) Appl. No.: 17/993,913

(22) Filed: Nov. 24, 2022

(65) Prior Publication Data

US 2023/0249029 A1 Aug. 10, 2023

(30) Foreign Application Priority Data

Feb. 10, 2022 (KR) .................. 10-2022-0017593

(51) Int. Cl.
| | | |
|---|---|---|
| A63B 23/02 | (2006.01) | |
| A63B 21/00 | (2006.01) | |
| A63B 21/06 | (2006.01) | |
| A63B 23/12 | (2006.01) | |

(52) U.S. Cl.
CPC ...... *A63B 23/0233* (2013.01); *A63B 21/0615* (2013.01); *A63B 21/159* (2013.01); *A63B 21/4034* (2015.10); *A63B 21/4035* (2015.10); *A63B 21/4047* (2015.10); *A63B 23/1218* (2013.01); *A63B 2208/0233* (2013.01)

(58) Field of Classification Search
CPC ............ A63B 23/0233; A63B 21/0615; A63B 21/159; A63B 21/4034; A63B 21/4035; A63B 21/4047; A63B 23/1218; A63B 2208/0233; A63B 21/078; A63B 21/4049; A63B 21/00065; Y02B 50/00
See application file for complete search history.

(56) References Cited

FOREIGN PATENT DOCUMENTS

KR 10-2031246 B1 10/2019

OTHER PUBLICATIONS

Ntaifitness Plate Loaded Lat Pulldown (https://www.fitness-china.com/plate-loaded-lat-pulldown; archived Aug. 9, 2020, accessed Jul. 18, 2024 (Year: 2020).*
Ntaifitness Vertical Traction (https://www.fitness-china.com/plate-loaded-lat-pulldown; archived Sep. 23, 2020, accessed Jul. 18, 2024) (Year: 2020).*
1006 Lat Pulldown (https://stexfitness.eu/plate-loaded-lat-pulldown/; achieved Aug. 6, 2020; accessed Jul. 18, 2024Z) (Year: 2020).*

\* cited by examiner

*Primary Examiner* — Megan Anderson
*Assistant Examiner* — Juan Carlos De Leon Diaz
(74) *Attorney, Agent, or Firm* — Revolution IP, PLLC

(57) ABSTRACT

A back exercise equipment includes a support frame seated on the bottom surface, a body frame connected to the support frame to form a support structure, a rotating part rotatably mounted to the body frame, a grip part connected to one end of the rotating part and providing a space for the user to grip, a lifting part that is connected to the other end of the rotating part, moves up and down being interlocked with the rotation of the rotating unit and provides a space in which a plate is mounted, and a seating part connected to the support frame and disposed in front of the body frame to provide a space in which the user can sit.

1 Claim, 6 Drawing Sheets

[Fig. 1]
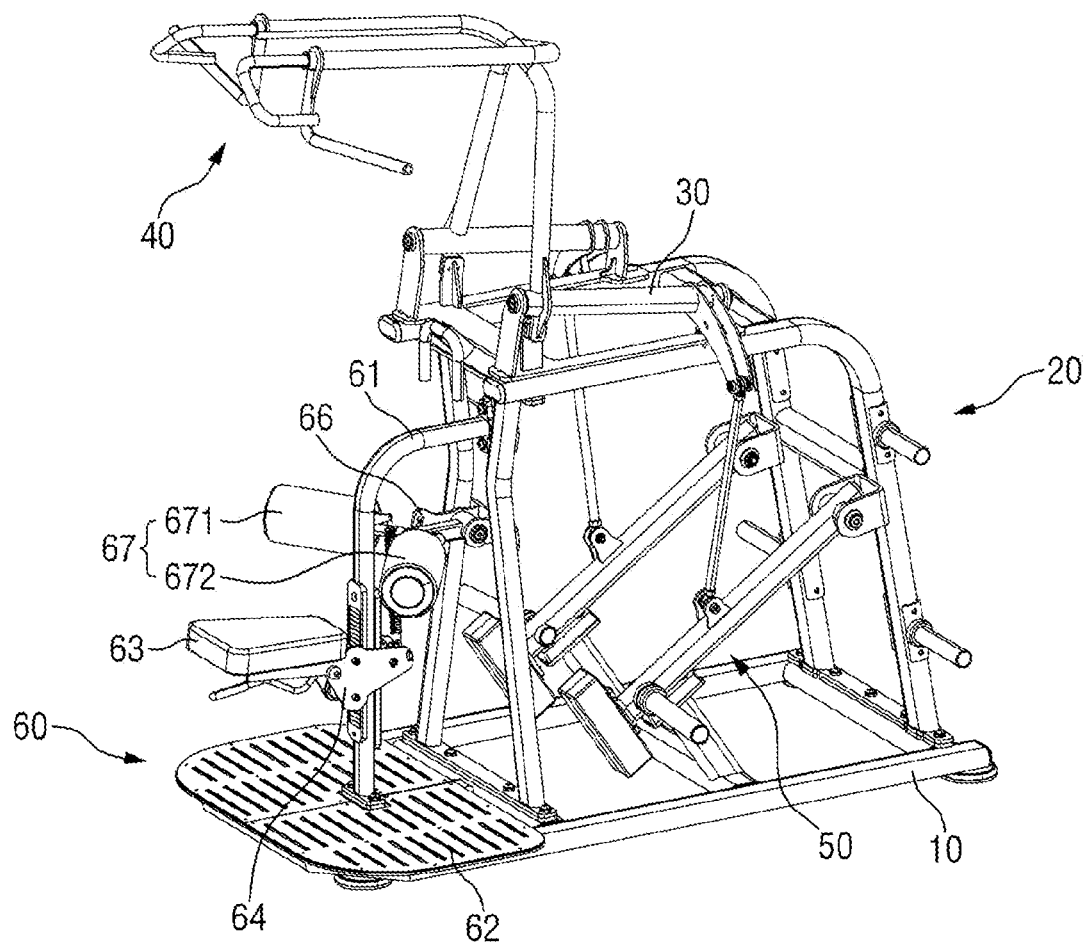

[Fig. 2]
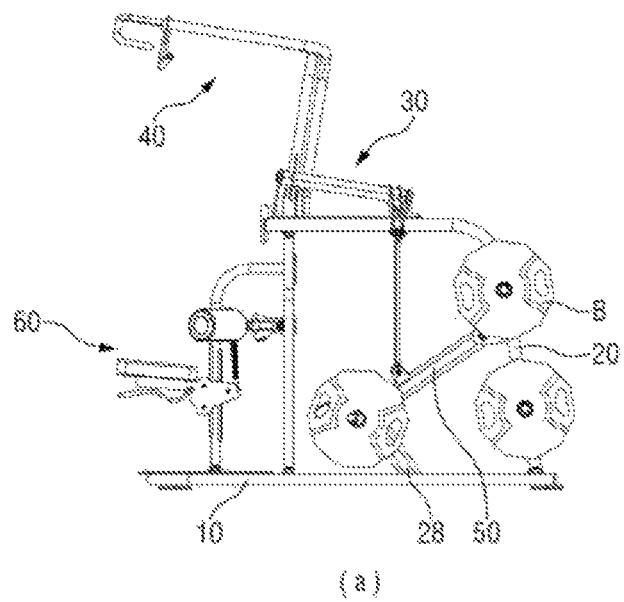
(a)
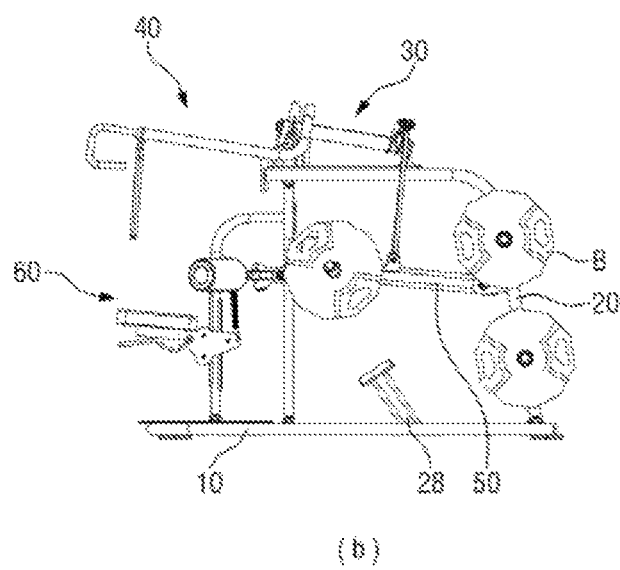
(b)

[Fig. 3]
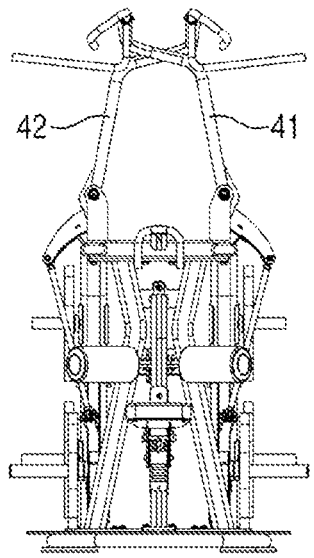
(a)
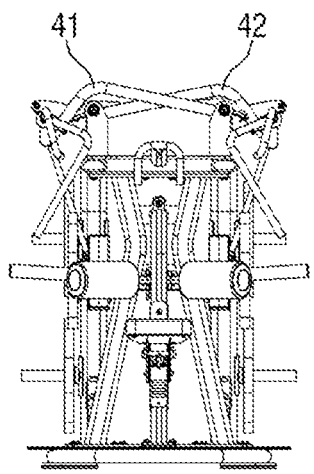
(b)

[Fig. 4]
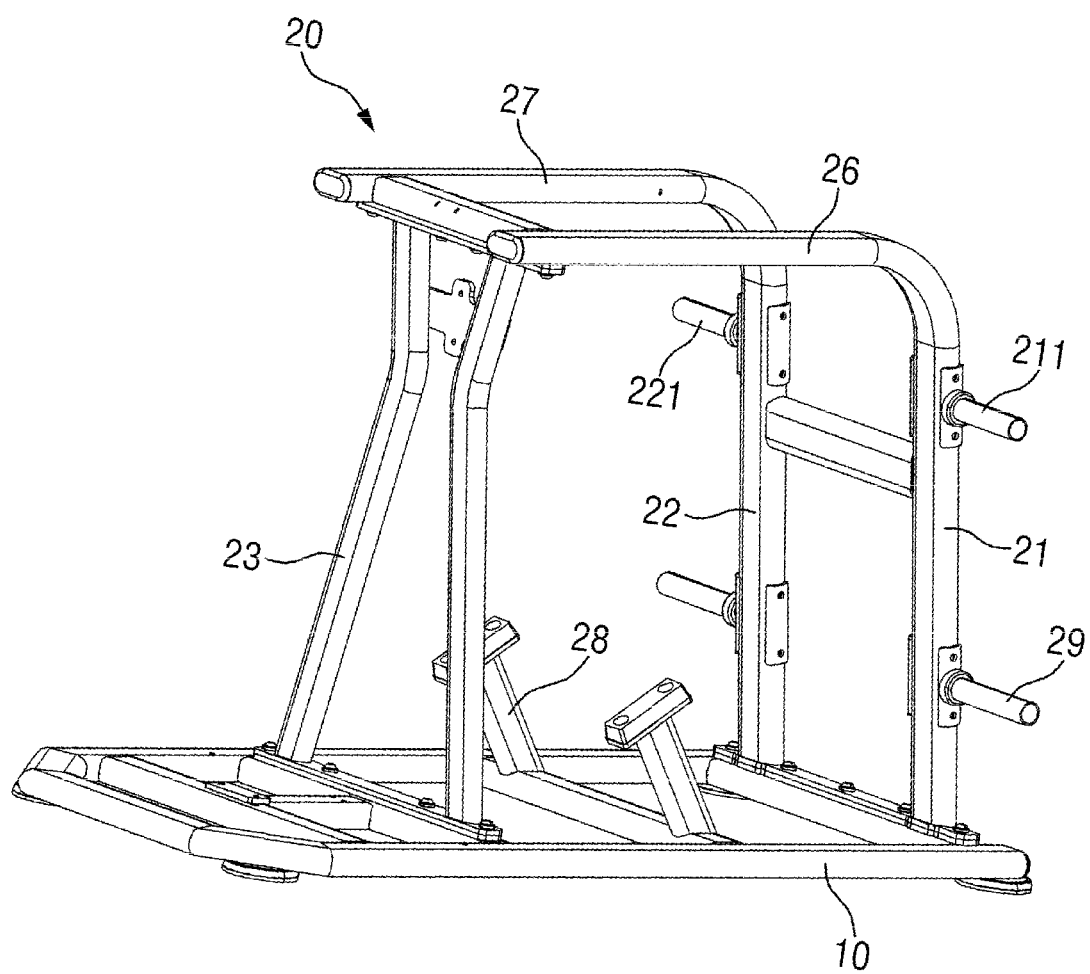

[Fig. 5]
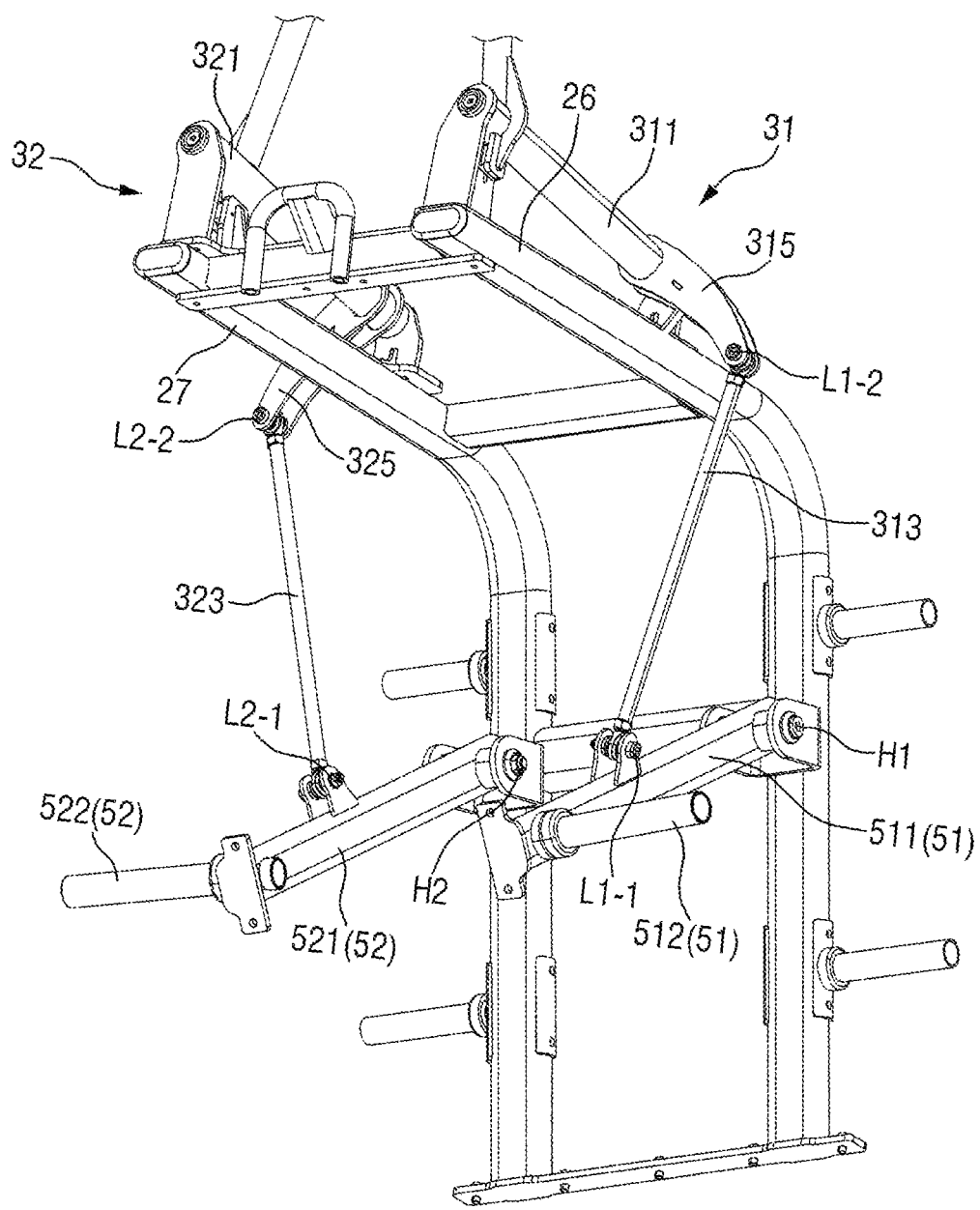

[Fig. 6]
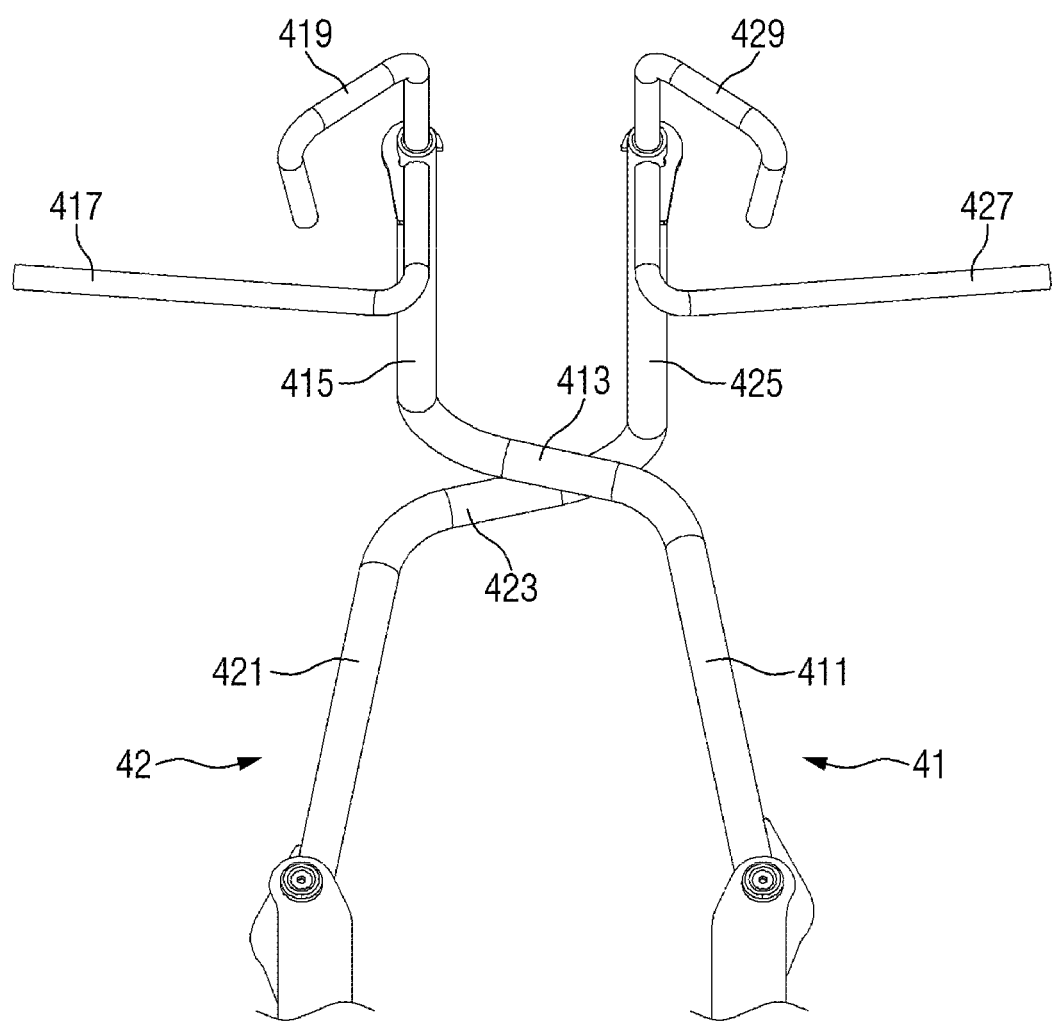

EXERCISE EQUIPMENT FOR BACK

TECHNICAL FIELD

The present invention relates to certain back exercise equipment, and more particularly, to certain back exercise equipment that can be used with a one-arm motion and can provide deeper stimulation to the lower back, thereby effectively developing back muscles.

BACKGROUND ART USED FOR INVENTION

Recently, as the public has increased interest in health, it has become very easy to learn related knowledge obviously due to the development of media covering exercise postures.

However, since the price of exercise equipment is not affordable, most people pay a fee to use exercise equipment at a gym. However, when there are many people during certain times or holidays, people often wait to use the exercise equipment they want.

In this regard, there is an increasing demand from many people for exercise equipment that allows many types of exercise without taking up a large space.

In particular, there is a demand for the development of exercise equipment capable of deeply stimulating various parts of the back and capable of exercise movements with one arm or both arms.

PRIOR TECHNOLOGY DOCUMENTATION

Patent Documentation (Patent Documentation 0001) Korean Patent No. 10-2031246

SUMMARY OF THE INVENTION

Problem to be Solved

An object of the present invention is to provide back exercise equipment capable of performing back exercises with one-arm operation and providing deep stimulation to the lower back by providing a configuration so that the arms operate independently.

An object of the present invention is to provide back exercise equipment capable of performing customized motions according to the purpose of exercise by providing various types of handles.

An object of the present invention is to provide back exercise equipment in which there is a large movable range and space occupied left and right is saved by providing a structure in which a handle and a disk are fastened in a linked manner.

Means to Solve the Problem

The back exercise equipment according to an embodiment of the present invention includes a support frame seated on a floor, a body frame connected to the support frame to form a support structure, a rotating part rotatably mounted on the body frame, a grip part connected to one end of the rotator and providing a space for the user to grip, and a lifting part connected to the other end of the rotator, moving up and down being interlocked with the rotating of the rotator, and providing a space in which a weight plate is mounted, and a seating part connected to the support frame and placed in front of the body frame to provide a space in which the user can sit, and, when the abovementioned grip part descends due to the external force applied by the user, it descends in an arc motion, and when the external force is released by the user, it can return along the descending path due to the weight of the weight plate mounted on the lifting part.

The rotating part of the back exercise equipment to an embodiment of the present includes a first rotating piece rotatably mounted on the body frame, a second rotating piece rotatably mounted on the body frame and placed in parallel with the first rotating piece, and the grip part is equipped with a first grip piece connected to the first rotating piece and bent toward the second rotating piece and extending toward the second rotating piece, and a second grip piece connected to the second rotating piece and bent toward the first rotating piece and extended toward the first rotating piece, and The first grip piece and the second grip piece are placed to cross each other; the first grip piece moves in an arc with respect to the first rotating piece, and the second grip piece moves in an arc with respect to the second rotating piece.

The body frame of the back exercise equipment according to an embodiment of the present invention includes a first standing frame standing from the support frame, a first parallel frame connected to the first standing frame and placed parallel to the floor, and the support frame, a second standing frame standing up from the first standing frame and placed in parallel with the first standing frame and a second parallel frame connected to the second standing frame and placed in parallel with the floor; the elevation part includes a first elevation member connected to the first standing frame and a second elevation member connected to the second standing frame; the first lifting piece includes a first lifting connecting bar rotatably connected to the first standing frame and a first seating part connected to the first lifting connecting bar and formed in a shape corresponding to the central hole of the weight plate; the first rotating piece includes a first rotating bar rotatably connected to the first parallel frame, a first link part connecting the first rotating bar and the first lifting connection bar, the first rotating bar interposed between the first link part and overlapping in the height direction, and a first transmitting part protruding outwardly of the body frame for connection of the first lifting connection bar; in the first transmitting part, one side is connected to the first rotating bar and the other side is connected to the first link part, and the other side is moved up and down according to the rotating of the first rotating bar so that the first link part is moved up and down, and the first lifting connection bar is linked to the lifting of the first link part, and can be rotated based on a first standing rotating axis connected to the first standing frame.

In the first link part of the back exercise equipment according to an embodiment of the present invention, one side is rotated based on a 1-1 link rotating axis formed between the first lifting connection bar and the first link part, and the other side is rotated based on the 1-2 link axis of rotating formed between the first transmitting part; the first transmitting part, one side is rotated relative to the 1-2 link axis of rotating and the other side is fixed to the first rotating bar; one side of the first grip piece is fixed while surrounding the outer circumferential surface of the first rotating bar, and the other side is formed as a free end; the first rotating bar can be rotated being interlocked with the rotating of the first grip piece.

The first grip piece of the back exercise equipment according to an embodiment of the present invention includes a first standing bar connected while standing up from the first rotating bar, a first bent part bent from the first standing bar toward the second parallel frame, a first extension part extending from the first bent part in a direction away from the body frame and placed in parallel with the first parallel frame, the 1-1 handle part connected to the end of the first extension part and formed in an "└" shape, and the 1-2 handle part connected to the end of the first extension part and formed in an "⊏" shape, and, the second grip piece includes a second standing bar connected while standing up from the second rotating bar, a second bent part bent from the second standing bar toward the second parallel frame, a second extension part extending from the second bent part in a direction away from the body frame and placed parallel to the second parallel frame, the 2-1 handle part connected to the end of the second extension part and formed in an "└" shape, and the 2-2 handle part connected to the end of the second extension and formed in a "⊏" shape; The 1-1 handle part and the 1-2 handle part can be placed asymmetrically to the 2-1 handle part and the 2-2 handle part, respectively.

The seating part of the back exercise equipment according to an embodiment of the present invention includes a seating frame connected to the body frame while standing up from the support frame, a footrest part seated on the support frame and placed on the lower side of the grip part, a seat part placed on the upper side of the footrest part, connected to the seating frame, and providing a space in which the user can sit, and the seating frame, and a height adjusting part that moves the seat and slides in a height direction along the seating frame or is fixed to the seating frame.

The body frame of the back exercise equip according to an embodiment of the present invention includes a third standing frame placed to face the seating part; The seating part includes an angle adjustment part mounted on the third standing frame and a knee support part connected to the angle adjustment part and placed above the knee of the user seated on the seat part and placed higher than the seat part; the knee support part is composed of a first knee support piece and a second knee support piece branched from the angle adjuster, and The angle adjustment part can be connected to be rotatable up and down from the third standing frame.

Effect of the Invention

The present invention has the effect of providing back exercise equipment capable of performing a back exercise with a single-arm operation and deeply stimulating the lower back by providing a configuration so that the arms can move independently.

The present invention is effective in providing back exercise equipment capable of performing customized motions according to the purpose of exercise by providing various types of handles.

The present invention has the effect of providing back exercise equipment capable of performing customized motions according to the purpose of exercise by providing various types of handles.

The present invention has the effect of providing back exercise equipment in which a large range of motion appears during operation and a space occupied on the left and right is saved by providing a structure to fasten the handle and the disk in a link manner.

BRIEF DESCRIPTION OF THE DRAWINGS

FIG. 1 is a schematic perspective view showing the back exercise equipment according to an embodiment of the present invention.

FIG. 2 is a schematic side view for explaining the operation of the back exercise equipment according to an embodiment of the present invention.

FIG. 3 is a schematic front view for explaining the operation of the back exercise equipment according to an embodiment of the present invention.

FIG. 4 is a schematic diagram for explaining a support frame and a body frame of the back exercise equipment according to an embodiment of the present invention.

FIG. 5 is a schematic diagram for explaining the rotating part and the lifting part of the back exercise equipment according to an embodiment of the present invention.

FIG. 6 is a schematic diagram illustrating a grip part of the back exercise equipment according to an embodiment of the present invention.

DESCRIPTION OF THE EMBODIMENTS

Hereinafter, specific embodiments of the present invention will be described in detail with reference to the drawings. However, the spirit of the present invention is not limited to the presented examples, and those skilled in the art who understand the spirit of the present invention can easily suggest other degenerative inventions or other embodiments included in the scope of the present invention through the addition, change, deletion, etc. of other elements within the scope of the same spirit, and, we can say that this is also included within the scope of the present invention.

In addition, components having the same function within the scope of the same idea appearing in the drawings of each embodiment are described using the same reference numerals.

FIG. 1 is a schematic perspective view showing the back exercise equipment according to an embodiment of the present invention, FIG. 2 is a schematic side view for explaining the operation of the back exercise equipment according to an embodiment of the present invention, and FIG. 3 is a schematic front view for explaining the operation of the back exercise equipment according to an embodiment of the present invention.

Also, FIG. 4 is a schematic diagram for explaining a support frame and a body frame of the back exercise equipment according to an embodiment of the present invention.

Referring to FIG. 1 to FIG. 4, the back exercise equipment (1) according to an embodiment of the present invention includes a support frame (10), a body frame (20), a rotating part (30), a grip part (40), a lifting part (50), and a seating part (60).

The support frame (10) can be seated on the bottom surface. The support frame (10) can be formed by interconnecting a plurality of frame frames.

The body frame (20) can be connected to the support frame (10) to form a support structure. The body frame (20) can also be formed by connecting multiple frame frames to each other.

Specifically, the body frame (20) can include a first standing frame (21) standing from the support frame (10), a first parallel frame (26) connected to the first standing frame (21) and placed parallel to the floor, a second standing frame (22) standing from the support frame (10) and placed in parallel with the first standing frame (21), and a second parallel frame (27) connected to the second standing frame (22) and placed parallel to the floor.

The frame constituting the body frame (20) can be formed with a weight plate storage part (29) capable of holding weight plates (B) of various weights.

The weight plate storage part (29) is a member that protrudes from the frame so that the central hole of the weight plate (B) can be inserted and mounted.

The rotating part 30 can be rotatably mounted on the body frame (20). Here, the rotating part (30) is formed in a cylindrical pipe shape, and rotating is implemented by rotating the central axis of the cylindrical rotating body.

The rotating part (30) is rotatably mounted on the first rotating piece (31) and the body frame (20) rotatably mounted on the body frame (20), and can be provided with a second rotating piece (32) placed parallel to the first rotating piece (31).

The first rotating piece (31) and the second rotating piece (32) can be formed in the same configuration.

In the present invention, since the rotating part (30), the grip part (40), the elevation part (50), and the grip part (40) are configured as a pair, and the user can exercise both arms or only one arm, only a part of the back muscles the user needs can be selectively exercised.

The grip part (40) is connected to one end of the rotating part (30), and can provide a space in which the user can grip. Here, the space that can be gripped means providing a member that the user can grab with their hands.

The elevation part (50) is connected to the other end of the rotating part (30), moves up and down being interlocked with rotating of the rotating part (30), and provides a space in which a weight plate is mounted.

In addition, the body frame (20) is connected to the support frame (10), and when the elevation part (50) descends, the body frame (20) can have more mounting parts (28) defining the lower limit of the elevation part (50).

The seating part (60) is connected to the support frame (10) and placed in front of the body frame (20) to provide a space in which the user can sit.

When the grip part (40) descends by an external force applied by the user, it descends in an arc motion, and when the external force by the user is released, it can be returned along one path descended by the weight of the weight plate mounted on the lifting part (50).

Specifically, the user sits on the seating part (60) while looking at the rotating part (30), and the elevation part (50) rises from the lowered position (see FIG. 2(a) and FIG. 3(a)) and can exercise by lifting the weight plate connected to the lifting part (50) by lowering the grip part (40) so as to be moved to the position (see FIG. 2(b) and FIG. 3(b)). Of course, the above-described operation can be implemented by sitting on the seat part (60) with the rotating part (30) turned away.

In this configuration, when the user descends while gripping the grip part (40), the rotating part (30) connected to the grip part (40) rotates, and the elevation part (50) connected according to the rotating of the rotating part (30) is lifted.

Details regarding this will be discussed in the rotating part (30) and the elevation part (50) with reference to FIG. 5.

Meanwhile, the seating part (60) of the back exercise equipment (1) according to an embodiment of the present invention includes a seating frame (61), a footrest part (62), a seat part (63), and a height adjusting part (64).

The seating frame (61) can be connected to the body frame (20) while standing up from the support frame (10).

The footrest part (62) is seated on the support frame (10) and can be placed on the lower side of the gripping part (40).

The seat part (63) is placed on the upper side of the footrest part (62), is connected to the seating frame (61), can provide a space in which the user can sit, and can be made of any material the user can feel a cushion.

The height adjusting part (64) can be configured to slide in a height direction along the seating frame (61) or be fixed to the sliding or seating frame (61) along the seating frame (61) to the height direction The user can exercise in a more comfortable state by adjusting the height adjusting part (64) to change the height of the seat part (63) from the bottom surface.

The body frame (20) can include a third standing frame (23) placed to face the seating part (60).

The seating part (60) is placed higher than the seat part (63) while being connected to the angle adjusting part (66) mounted on the third standing frame (23) and the angle adjusting part (66), so that the knee support part (67) placed above the knee of the user seated on (63) can be provided.

The knee support part (67) can be composed of a first knee support piece (671) and a second knee support piece (672) branched from the angle adjusting part (66).

The angle adjusting part (66) can be connected to be rotatable up and down from the third standing frame (23).

FIG. 5 is a schematic diagram for explaining the rotating part and the lifting part of the back exercise equipment according to an embodiment of the present invention.

Referring to FIG. 5, the elevating part (50) of the back exercise equipment (1) according to an embodiment of the present invention includes a first elevating piece (51) connected to the first standing frame (21) and a second lifting piece (52) connected to the second standing frame (22).

The first lifting piece (51), while connected to the first lifting connecting bar (511) rotatably connected to the first standing frame (21) and the first lifting connecting bar (511), while being connected to the weight plate, can include a first seating part (512) formed in a shape corresponding to the central hole.

The first rotational front piece (31) can include a first rotational front bar (311), a first link part (313) and a first transmitting part (315).

The first rotating bar (311) can be rotatably connected to the first parallel frame (26). The first link part (313) can connect the first rotating bar (311) and the first lifting connection bar (511).

The first transmission part (315) moves the first rotating bar (311) and the first link part (313), and overlaps the first rotating bar (311) and the first link part (313) in a height direction, and for the connection of the lifting connection bar (511), it can be formed to protrude outward from the body frame (20).

The first transmission part (315) has one side connected to the first rotating bar (311) and the other side connected to the first link part (313), so according to the rotating of the first rotating bar (311), the other side is moved up and down, and the first link part (313) can be moved up and down.

The first lifting connecting bar (511) is interlocked with the lifting of the first link part (313) and can be rotated based on the first standing rotating shaft (H1) connected to the first standing frame (21).

The first link part (313) has one side rotated based on the 1-1 link rotating axis (L1-1) formed between the first lifting connection bar (511) and the other side of the first transmission part (315) can be rotated based on the 1-2 link rotating axis (L1-2) formed between the link.

One side of the first transmission part (315) can be rotated based on the 1-2 link rotating axis (L1-2), and the other side can be fixed to the first rotating bar (311).

One side of the first grip piece (41) can be fixed while surrounding the outer circumferential surface of the first rotating bar (311), and the other side can be formed as a free end.

The first rotating bar (311) can be rotated being interlocked with the rotating of the first grip piece (41).

The second lifting piece (52), while connected to the second lifting connecting bar rotatably connected to the second standing frame (22) and the second lifting connecting bar, can include a second seating part (522) formed in a shape corresponding to the central hole of the weight plate.

The second rotary front piece (32) can include a second rotary front bar (321), a second link part (323) and a second transmission part (325).

The second rotating bar (321) can be rotatably connected to the second parallel frame (27).

The second link part (323) can connect the second rotating bar (321) and the second lifting connection bar.

The second transmission part (325) transmits the second rotating bar (321) and the second link part (323), and can be formed to protrude outward from the body frame (20) for the connection of the overlapped and placed second rotating bar (321) in the height direction and the second lifting connection bar (321).

The second transmission part (325), while having one side connected to the second rotating bar (321) and the other side connected to the second link part (323), the other side is moved up and down according to the rotating of the second rotating bar (321) to move the second link part (323) up and down.

The second lifting connection bar can be rotated based on a second standing rotating shaft H2 connected to the second standing frame (22) being interlocked with the lifting of the second link part (323).

The second link part (323) has one side rotated based on the 2-1 link rotating shaft (L2-1) formed between the second lifting connecting bar and the other side of the second transmission part (325) and can be rotated based on the 2-2 link rotating axis (L2-2) formed between them.

The second transmission part (325) has one side rotated with respect to the 2-2 link rotating axis (L2-2), and the other side can be fixed to the second rotating bar (321).

The second grip piece (42) can have one side fixed while surrounding the outer circumferential surface of the second rotating bar (321), and the other side can be formed as a free end.

The second rotating bar (321) can be rotated being interlocked with the rotating of the second grip piece (42).

FIG. 6 is a schematic diagram for explaining a grip part of the back exercise equipment according to an embodiment of the present invention.

Referring to FIG. 6, the grip part (40) of the back exercise equipment (1) according to an embodiment of the present invention can include a first grip piece (41), which is connected to the above first rotating piece (31), and bent and extended to the second rotating piece (32), and a second grip piece (42), which is bent and extended toward the first rotational piece (31).

The first grip piece (41) and the second grip piece (42) can be placed to cross each other.

The first grip piece (41) moves in an arc with respect to the first rotating piece (31), and the second grip piece (42) moves in an arc with respect to the second rotating piece (32).

The first grip piece (41) can include a first standing bar (411), a first bent part (413), a first extension part (415), a 1-1 handle part (417), and a 1-2 A handle part (419).

The first standing bar (411) can be connected while standing up from the first rotating bar (311).

The first bent part (413) can be bent from the first standing bar (411) toward the second parallel frame (27).

The first extension part (415) can be placed parallel to the first parallel frame (26), while extending from the first bent part (413), and extending in a direction away from the body frame (20).

The 1-1 handle part (417) can be connected to the end of the first extension part (415), and can be formed in an "└" shape.

The 1-2 handle part (419) is connected to the end of the first extension part (415) and can have a 1-2 handle part (419) formed in a "⊏" shape.

The second grip piece (42) can include the second standing bar 421, the second bent part (423), the second extension part (425), the 2-1 handle part (427) and the 2-2 A handle part (429).

The second standing bar (421) can be connected while standing up from the second rotating bar (321).

The second extension part (425) extends from the second bent part 423, and extends in a direction away from the body frame (20) to be placed parallel to the second parallel frame (27).

The 2-1 handle part (427) is connected to the end of the second extension part (425) and can be formed in an "└" shape.

The 2-2 handle part (429) can include a 2-2 handle part (429) connected to the end of the second extension part 425 and formed in a "⊏" shape.

The 1-1 handle part (417) and the 1-2 handle part (419) can be placed asymmetrically to the 2-1 handle part (427) and the 2-2 handle part (429), respectively.

The user can use the 1-1 handle part (417) and the 1-2 handle part (419) (wide grip) to draw a semicircle from the outside to the inside and rotate to intensively exercise the latissimus dorsi muscle.

In addition, the user can intensively exercise using the 1-2 handle part (419) and the 2-2 handle part (429) (parallel grip) to target the inside of the back.

As stated the above, the configuration and characteristics of the present invention have been described based on the embodiments according to the present invention, but the present invention is not limited thereto, and it is apparent to those skilled in the art to which it pertains that various changes or modifications can be made within the spirit and scope of the present invention, and therefore it is made clear that such changes or modifications are included within the scope of the appended claims.

DESCRIPTION OF THE SYMBOLS

1: EXERCISE EQUIPMENT FOR BACK
10: Support frame
20: Body frame
30: Rotating part
31: $1^{st}$ turn piece
32: $2^{nd}$ rotating piece
H1: $1^{st}$ standing rotating axis
H2: $2^{nd}$ standing rotating axis
40: Grip part
41: $1^{st}$ grip piece
42: $2^{nd}$ grip piece
50: lift part
51: $1^{st}$ lifting piece
52: $2^{nd}$ lifting piece
60: Seating part

The invention claimed is:
1. An exercise equipment comprising:
a support frame seated on a floor;
a body frame connected to the support frame to form a support structure, wherein the body frame includes:
 a first standing frame standing from the support frame,
 a first parallel frame connected to the first standing frame and disposed parallel to the floor,
 a second standing frame standing from the support frame and arranged parallel to the first standing frame, and
 a second parallel frame connected to the second standing frame and arranged parallel to the floor;
a rotating part rotatably mounted to the body frame, wherein the rotating part includes:
 a first rotating piece rotatably mounted on the body frame and having a first rotating bar, a first link part, and a first transmitting part, and
 a second rotating piece rotatably mounted on the body frame and having a second rotating bar, a second link part, and a second transmitting part, wherein the second rotating piece is disposed parallel to the first rotating piece;
a grip part connected to one end of the rotating part and providing a space for a user to grip, wherein the grip part includes:
 a first grip piece connected to the first rotating piece, wherein the first grip piece includes:
  a first standing bar connected while standing up from the first rotating bar,
  a first bent part bent from the first standing bar toward the second parallel frame,
  a first extension part extending from the first bent part in a direction away from the body frame and disposed parallel to the first parallel frame,
  a 1-1 handle part connected to the end of the first extension part and formed in a " L " shape, and
  a 1-2 handle part connected to the end of the first extension part and formed in a " ⊏ " shape, and
 a second grip piece connected to the second rotating piece, wherein the second grip piece includes:
  a second standing bar connected while standing from the second rotating bar,
  a second bent part bent from the second standing bar toward the second parallel frame,
  a second extension part extending from the second bent part in a direction away from the body frame and disposed parallel to the second parallel frame,
  a 2-1 handle part connected to the end of the second extension part and formed in a " L " shape, and
  a 2-2 handle part connected to the end of the second extension part and formed in a " ⊏ " shape,
 wherein the first grip piece and the second grip piece are placed to cross each other,
 wherein the first grip piece moves in an arc based on the first rotating piece, and
 wherein the second grip piece moves in a circular arc based on the second rotating piece;
a lifting part connected to the other end of the rotating part and configured to move up and down being interconnected with rotation of the rotating part, wherein the lifting part includes:
 a first lifting piece connected to the first standing frame and having:
  a first lifting connection bar rotatably connected to the first standing frame and configured to rotate based on a first standing rotation axis connected to the first standing frame, and
  a first seating part connected to the first lifting connection bar and formed in a shape corresponding to a central hole of a weight plate, and
 a second lifting piece connected to the second standing frame,
 wherein the first link part connects the first rotating bar and the first lifting connection bar,
 wherein the first transmitting part protrudes outwardly of the body frame and connects the first rotating bar and the first link part while overlapping in a height direction,
 wherein one side of the first transmitting part is connected to the first rotating bar and the other side is connected to the first link part, such that the other side moves up and down according to rotation of the first rotating bar causing the first link part to move up and down, and
 wherein the first lifting connection bar is configured to rotate being interlocked with lifting of the first link part;
a seating part connected to the support frame and placed in front of the body frame to provide a space for the user to sit, wherein the seating part includes:
 a seating frame connected to the body frame while standing up from the support frame,
 a footrest part seated on the support frame and disposed on a lower side of the grip part,
 a seat part placed on an upper side of the footrest part and connected to the seating frame,
 a height adjusting part that connects the seating frame and the seat part, wherein the height adjusting part is configured to slide along the seating frame in a height direction or be fixed to the seating frame,
 an angle adjusting part mounted on a third standing frame of the body frame, wherein the third standing frame is placed to face the seating part, and
 a knee support part connected to the angle adjusting part and placed higher than the seat part and disposed above a knee of the user seated on the seat part, wherein:
  the knee support part includes a first knee support piece and a second knee support piece branched from the angle adjusting part, and
  the angle adjusting part is connected to be rotatable up and down from the third standing frame;
wherein the grip part is configured to
 descend in an arc motion that forms a path when an external force is applied by the user, and
 return along the path when the external force is released, due to a weight of the weight plate mounted on the lifting part.

* * * * *